US011161688B2

(12) United States Patent
Lindbo et al.

(10) Patent No.: US 11,161,688 B2
(45) Date of Patent: Nov. 2, 2021

(54) ROBOTIC PARKING DEVICE AND HANDLING METHOD

(71) Applicant: OCADO INNOVATION LIMITED, Hatfield (GB)

(72) Inventors: Lars Sverker Ture Lindbo, Hatfield (GB); Andrew John Ingram-Tedd, Hatfield (GB); Pawel Karolinczak, Hatfield (GB); Matthew Whelan, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 16/986,854

(22) Filed: Aug. 6, 2020

(65) Prior Publication Data

US 2020/0361707 A1  Nov. 19, 2020

Related U.S. Application Data

(63) Continuation of application No. 15/566,535, filed as application No. PCT/EP2016/058378 on Apr. 15, 2016, now Pat. No. 10,766,698.

(30) Foreign Application Priority Data

Apr. 15, 2015 (GB) .................................. 1506365
Aug. 13, 2015 (GB) .................................. 1514428
(Continued)

(51) Int. Cl.
*B65G 1/04* (2006.01)
*B65G 57/03* (2006.01)
(Continued)

(52) U.S. Cl.
CPC ............ *B65G 1/0464* (2013.01); *A01G 9/022* (2013.01); *A01G 9/16* (2013.01); *A01G 9/18* (2013.01);
(Continued)

(58) Field of Classification Search
CPC .. B65G 1/0464; B65G 1/0407; B65G 1/0478; B65G 1/065; B65G 1/137; B65G 57/03;
(Continued)

(56) References Cited

U.S. PATENT DOCUMENTS 2,701,065 A  2/1955 Bertel
3,390,791 A  7/1968 Baldwin et al.
(Continued)

FOREIGN PATENT DOCUMENTS

CN  102733630 A  10/2012
DE  10151916 A1  5/2003
(Continued)

OTHER PUBLICATIONS

International Search Report (PCT/ISA/210) dated Jul. 11, 2016, by the Japanese Patent Office as the International Searching Authority for International Application No. PCT/EP2016/058378.
(Continued)

*Primary Examiner* — Glenn F Myers
(74) *Attorney, Agent, or Firm* — Buchanan Ingersoll & Rooney PC

(57) ABSTRACT

An exemplary robotic parking device of the present disclosure includes a number of stacks of containers. The stacks being positioned within a frame structure including uprights and a horizontal grid disposed above the stacks. The grid having substantially perpendicular rails on which load handling devices can run. Cars or vehicles are positioned in containers and are moved into and out of the stacks by the robotic handling devices running on the grid. The cars are
(Continued)

put into the grid at entry points that may be positioned at points under the stacks.

10 Claims, 15 Drawing Sheets

(30) Foreign Application Priority Data

| Oct. 13, 2015 | (GB) | 1518089 |
|---|---|---|
| Oct. 13, 2015 | (GB) | 1518091 |
| Oct. 13, 2015 | (GB) | 1518094 |
| Oct. 13, 2015 | (GB) | 1518111 |
| Oct. 13, 2015 | (GB) | 1518115 |
| Oct. 13, 2015 | (GB) | 1518117 |
| Feb. 9, 2016 | (GB) | 1602332 |
| Feb. 25, 2016 | (GB) | 1603328 |

(51) Int. Cl.

| E04H 6/18 | (2006.01) |
|---|---|
| A01G 9/02 | (2018.01) |
| A01G 9/16 | (2006.01) |
| A01G 9/18 | (2006.01) |
| A01G 31/06 | (2006.01) |
| A47L 7/00 | (2006.01) |
| B62D 33/02 | (2006.01) |
| B65D 21/02 | (2006.01) |
| B65G 1/06 | (2006.01) |
| B65G 1/137 | (2006.01) |
| B65G 63/00 | (2006.01) |
| B65G 67/02 | (2006.01) |
| E04B 1/348 | (2006.01) |
| E06B 9/68 | (2006.01) |

(52) U.S. Cl.
CPC ............ *A01G 31/06* (2013.01); *A47L 7/0047* (2013.01); *B62D 33/02* (2013.01); *B62D 33/0207* (2013.01); *B65D 21/0212* (2013.01); *B65G 1/0407* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *B65G 2207/22* (2013.01); *B65G 2207/40* (2013.01); *E04B 1/34807* (2013.01); *E04H 6/18* (2013.01); *E06B 9/68* (2013.01); *E06B 2009/6818* (2013.01); *Y02A 40/25* (2018.01); *Y02P 60/14* (2015.11); *Y02P 60/21* (2015.11); *Y10S 901/01* (2013.01)

(58) Field of Classification Search
CPC .. B65G 63/004; B65G 67/02; B65G 2207/22; B65G 2207/40; Y02P 60/21; Y02P 60/14; Y02A 40/25; A01G 9/022; A01G 9/16; A01G 9/18; A01G 31/06; A47L 7/0047; B62D 33/02; B62D 33/0207; B65D 21/0212; E04B 1/34807; E04H 6/18; E06B 9/68; E06B 2009/6818; Y10S 901/01

See application file for complete search history.

(56) References Cited

U.S. PATENT DOCUMENTS

| 3,620,388 A | 11/1971 | Mansson |
|---|---|---|
| 3,804,033 A | 4/1974 | Izawa et al. |
| 5,040,935 A | 8/1991 | Gearin et al. |
| 5,639,174 A | 6/1997 | Gonska |
| 5,707,199 A | 1/1998 | Faller |
| 6,654,662 B1 | 11/2003 | Hognaland |
| 7,850,412 B2 | 12/2010 | Benedict et al. |
| 2002/0178692 A1 | 12/2002 | Panzarella et al. |
| 2009/0081011 A1 | 3/2009 | Kaufmann et al. |
| 2013/0085596 A1 | 4/2013 | Shani |
| 2013/0322993 A1 | 12/2013 | Farid et al. |
| 2015/0175354 A1 | 6/2015 | Kharkover |
| 2017/0129703 A1 | 5/2017 | Lindbo et al. |
| 2018/0086559 A1 | 3/2018 | Lindbo et al. |

FOREIGN PATENT DOCUMENTS

| DE | 202006002586 U1 | 4/2006 |
|---|---|---|
| DE | 20321192 U1 | 5/2006 |
| EP | 0740034 A1 | 10/1996 |
| EP | 1037828 B1 | 9/2003 |
| EP | 2663703 B1 | 3/2014 |
| GB | 2514930 A | 12/2014 |
| GB | 2525309 A | 10/2015 |
| JP | H 07 192198 A | 7/1995 |
| WO | 2013167907 A1 | 11/2013 |
| WO | 2014090684 A1 | 6/2014 |
| WO | 2015019055 A1 | 2/2015 |

OTHER PUBLICATIONS

Written Opinion (PCT/ISA/237) dated Jul. 11, 2016, by the Japanese Patent Office as the International Searching Authority for International Application No. PCT/EP2016/058378.

Great Britain Search Report dated Dec. 16, 2015, in the corresponding Great Britain Patent Application No. GB 1514428.0.

Great Britain Search Combined Search and Examination Report dated Nov. 22, 2016, in the corresponding Great Britain Application No. GB 1606669.8.

Office Action (Decision of Rejection) dated Jan. 26, 2021, by the Japanese Patent Office in corresponding Japanese Patent Application No. 2017-554042, and an English Translation of the Office Action. (6 pages).

Office Action dated Aug. 18, 2021, by the Chinese Patent Office in corresponding Chinese Patent Application No. 201680021906.9. (8 pages).

ROBOTIC PARKING DEVICE AND HANDLING METHOD

This application is a continuation of U.S. application Ser. No. 15/566,535, filed Oct. 13, 2017, which is a U.S. National Phase of International Application No. PCT/EP2016/058378, filed Apr. 15, 2016, which claims priority from UK Patent Application Nos. GB1506365.4 filed Apr. 15, 2015, GB1514428.0 filed Aug. 13, 2015, GB1518089.6 filed Oct. 13, 2015, GB1602332.7 filed Feb. 9, 2016, GB1518091.2 filed Oct. 13, 2015, GB1518094.6 filed Oct. 13, 2015, GB1518111.8 filed Oct. 13, 2015, GB1518115.9 filed Oct. 13, 2015, GB1518117.5 filed Oct. 13, 2015 and GB1603328.4 filed Feb. 25, 2016 the content of all these applications hereby being incorporated by reference.

The present invention relates to a robotic parking system device and method. More specifically but not exclusively, it relates to how an established technology for order picking and sortation of smaller items can be scaled up to create a high density, high throughput parking system.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

There are over one billion cars in the world and most of them are parked at any given point in time. In many cities and other locations, car parking requires a substantial percentage of the available land, which has led to the evolution of the multi-storey car park. Due to the need to random access to all of the cars, restrictions imposed by varying sizes of vehicles, structural needs of the buildings and the need for drivers and passengers to comfortably access their vehicles, such car parks do not fully utilise the available volume for parked cars. In fact, only around 10% of the volume of a typical multi storey car park is actually filled with the volume of cars. The present invention seeks to increase that number to around 40%.

Methods for parking vehicles more densely using mechanical devices exist as described in patent applications EP0740034 A1 and DE10151916 A1 or patents U.S. Pat. No. 3,390,791 and EP2663703 B1. The Otto Wöhr Company claims to have delivered over 400,000 mechanised parking locations globally over the years. Such systems allow more density than a conventional multi storey garage, but have some significant drawbacks. These include cost, reliability and throughput capacity. These factors have therefore made them difficult to justify in many situations. The present invention uses a completely different principle to address these drawbacks.

Methods of handling containers stacked in rows are well known. In some such systems, for example as described in U.S. Pat. No. 2,701,065 Bertel, comprise freestanding stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 1037828 B1 (Autostore), the contents of which are incorporated herein by reference. This describes a system in which stacks of containers are arranged within a frame structure. Robotic load handling devices can be controllably moved around the stack on a system of tracks on the upper most surface of the stack.

One development of load handling device is described in PCT Application No GB2014/052273, where each robotic load handler only covers one grid space, thus allowing higher density of load handlers and thus higher throughput of a given size system. As described in GB Patent Application No 1506364.7, containers may also be of varying heights and sizes.

According to the invention there is provided a robotic parking system comprising a plurality of vehicle holding containers, the containers being disposed in stacks within a frame work structure, the frame work structure comprising a series of substantially vertical uprights having a substantially horizontal grid mounted thereon, the grid comprising two substantially perpendicular sets of rails on which at least one load handling device is operable, the load handling device comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails in which the containers comprise a vehicle carrying platform and supports, the supports positioned and sized such that each container supports the container immediately above in the stack.

The key benefits over the prior art of conventional multi-storey car parks is much higher density of parking. Around four times more vehicles should be achievable.

Additionally, it will be much faster than driving up and down several levels of multi storeys and there would be less risk of damage to the vehicles. The key benefits over prior art mechanised car parks are cost, since the load handlers would on average be much better utilised than the cranes of the prior art systems, for any given maximum throughput capacity. It would be reliability, since the system could easily be designed so that any one load handler breaking down would not prevent access to any of the vehicles. Moreover, the present invention would improve space utilisation, by up to a factor of two.

The invention will now be described with reference to the accompanying diagrammatic drawings in which.

Figure 1:
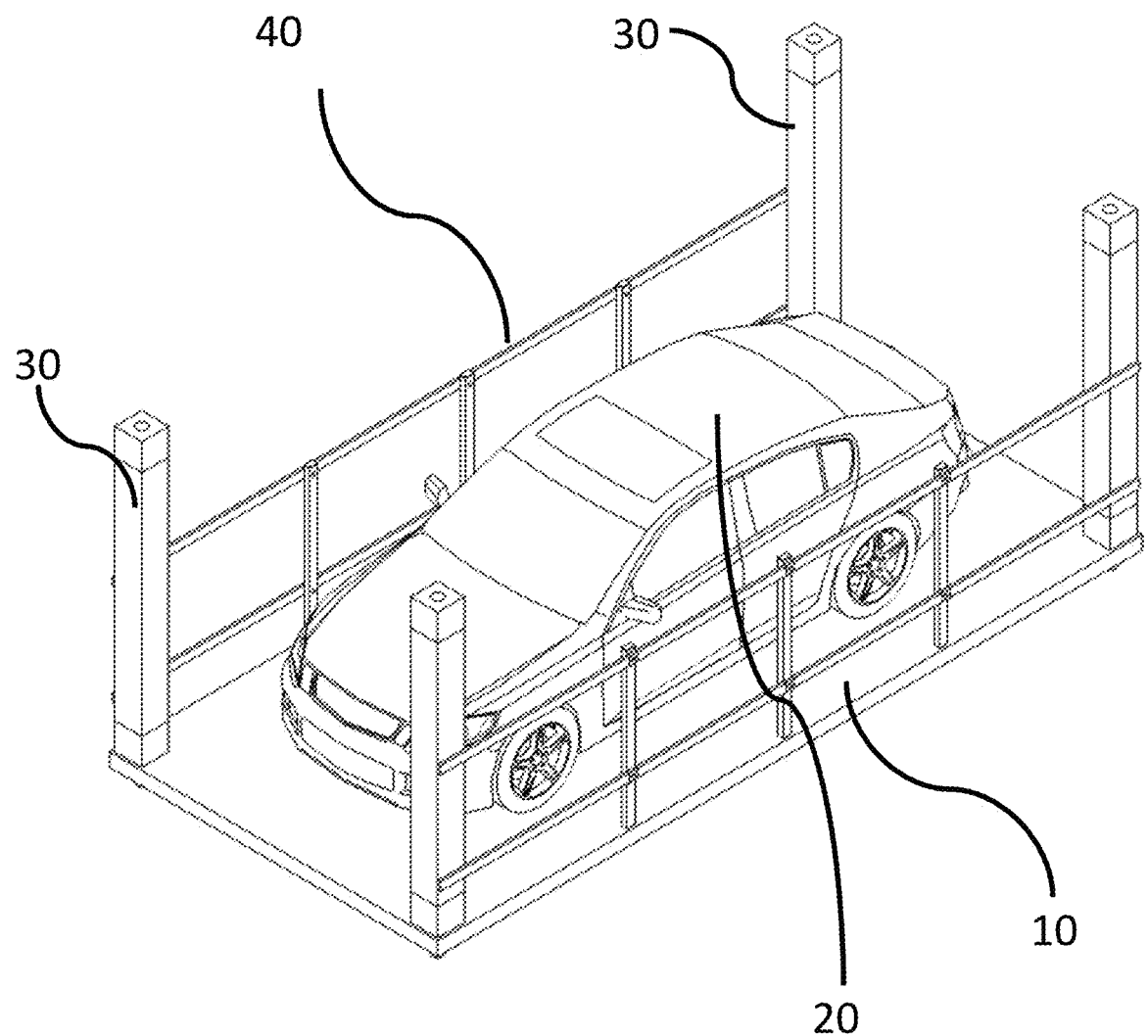
FIG. 1 shows a schematic perspective view of a container for use in a robotic car parking system, with a vehicle inside in accordance with one aspect of the invention, the container comprising four corner supports and moveable sides.
Figure 2:
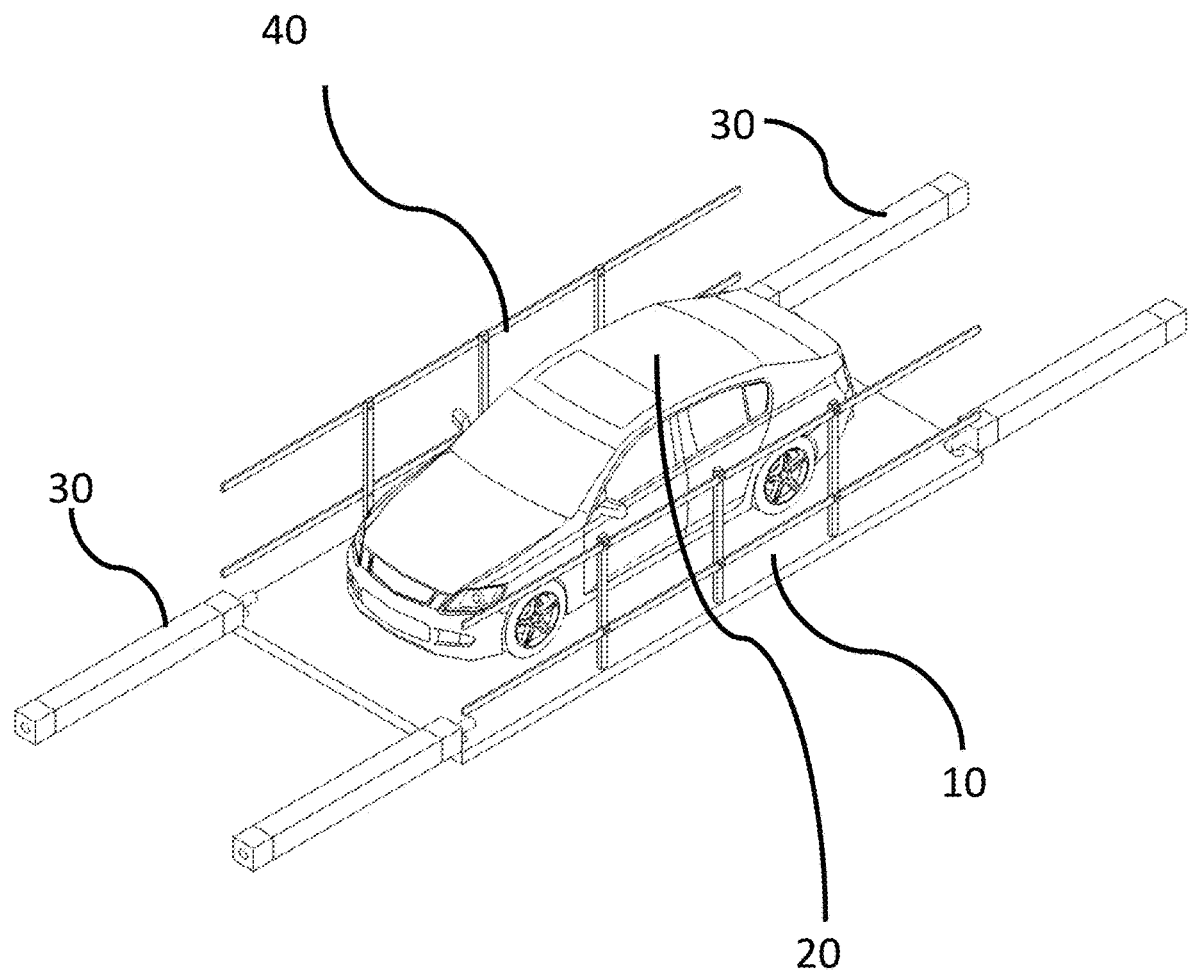
FIG. 2 shows a schematic perspective view of the container of FIG. 1 showing the corner supports folded down, the vehicle being located on a base plate attached to the corner supports.
Figure 3:
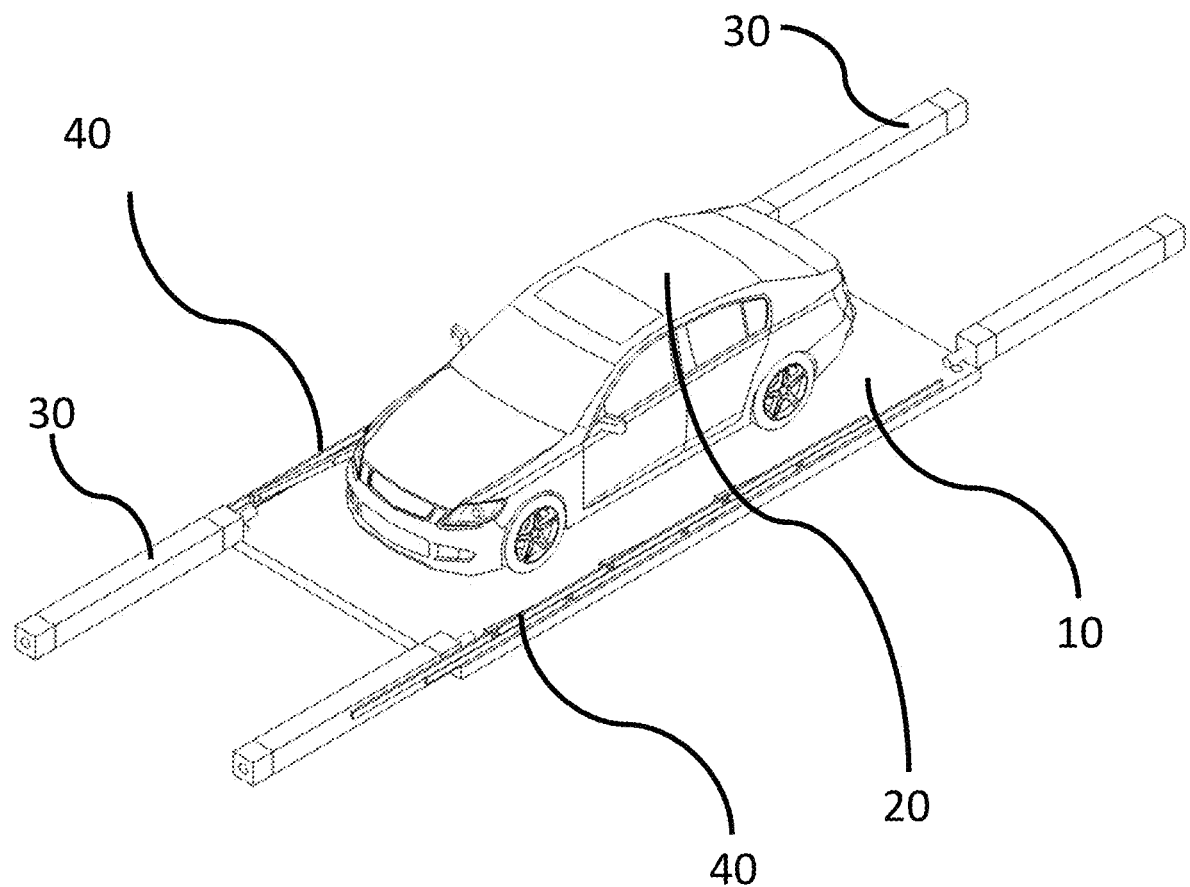
Figure 4A:
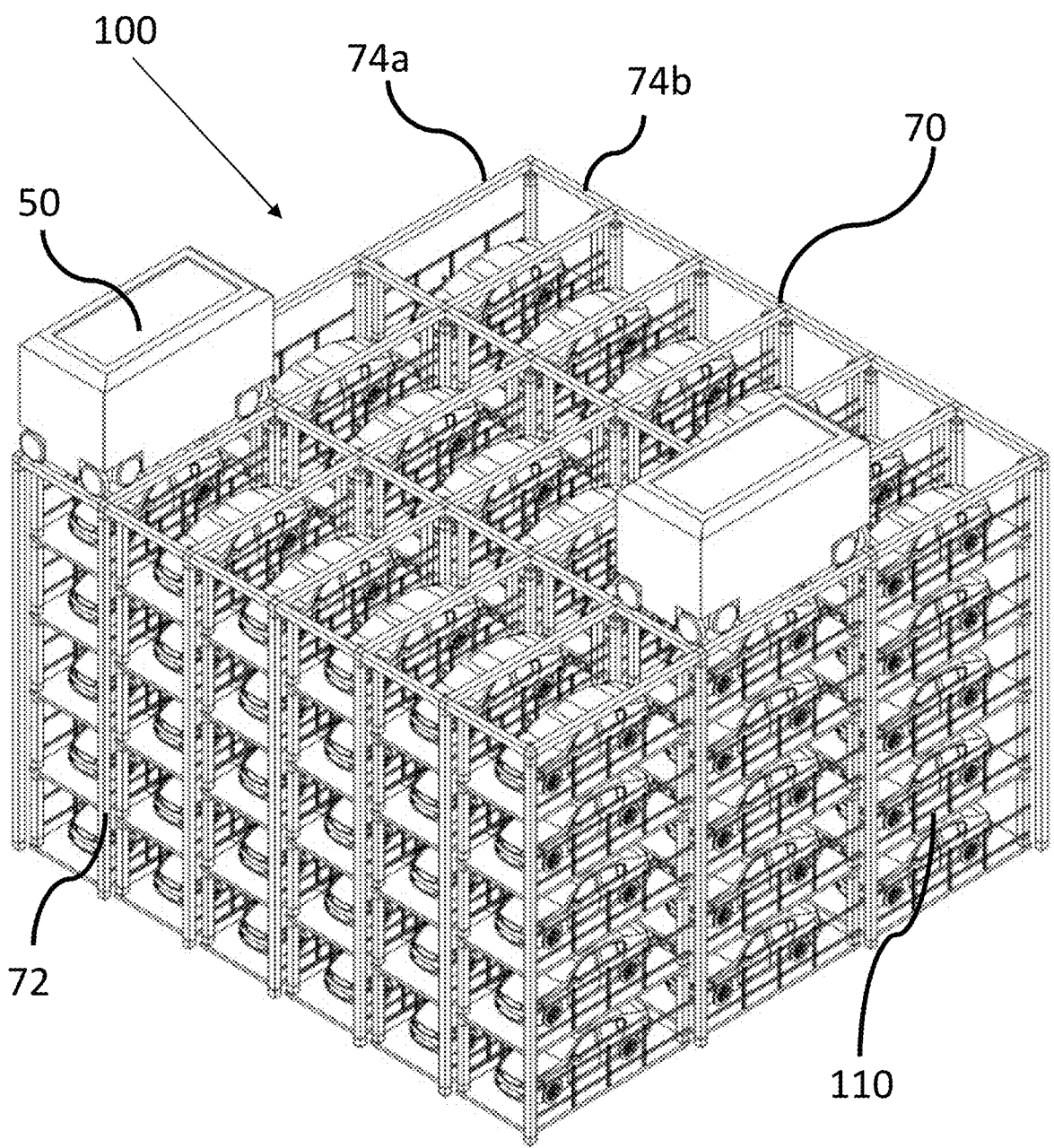
Figure 4B:
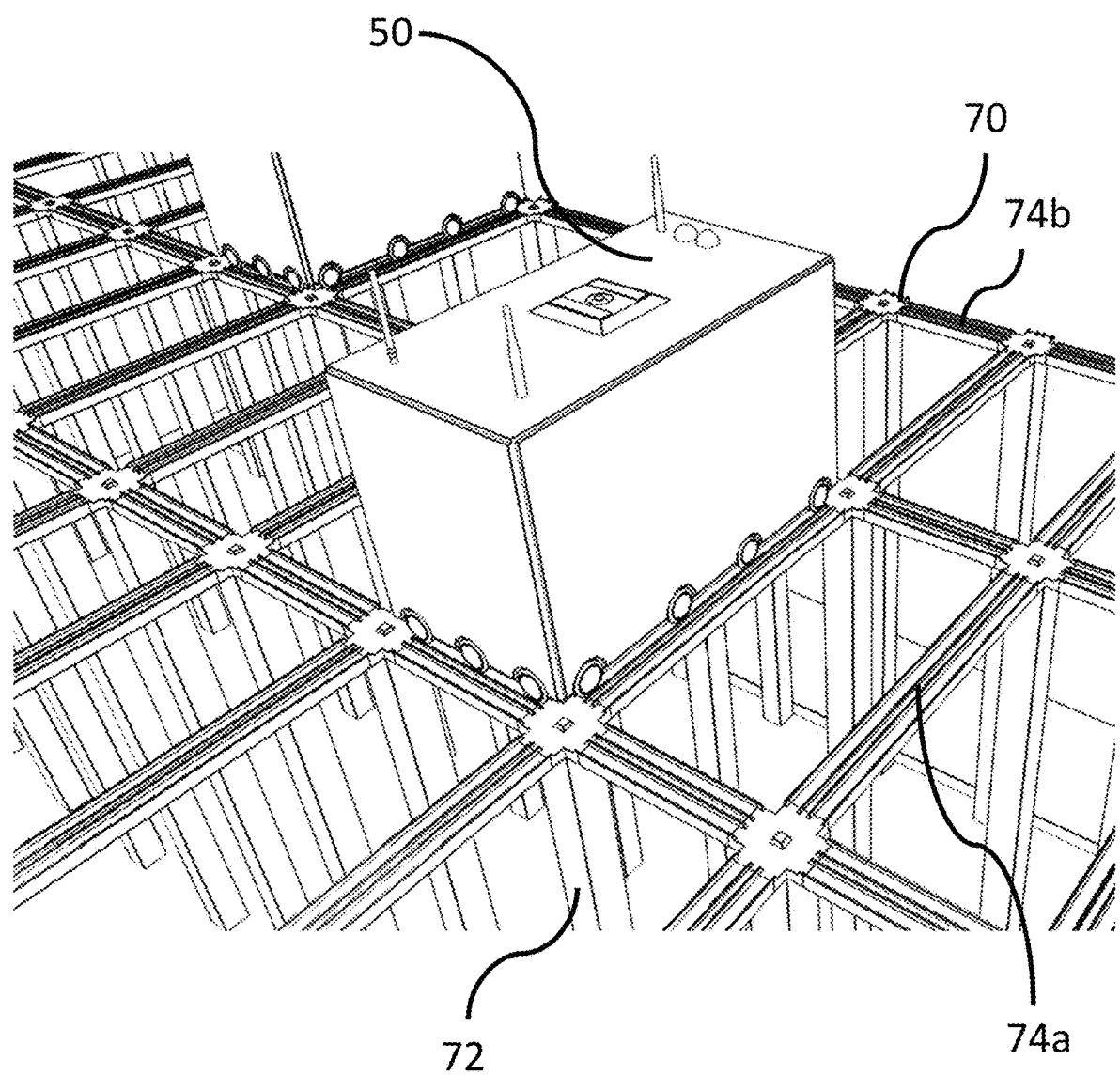

FIG. 3 shows a schematic perspective view of the container of FIGS. 1 and 2 showing the side barriers folded down to allow for access in to the vehicle, FIG. 4a shows a schematic perspective view of a robotic parking system in accordance with one aspect of the invention, the system comprising a number of stacks of containers as shown in FIGS. 1 to 3, the stacks being positioned within a frame structure comprising uprights and a horizontal grid disposed above the stacks, the grid comprising substantially perpendicular rails on which load handling devices can run;

FIG. 4b shows a schematic perspective view of a load handling device in situ on the robotic parking system, the load handling device running on a double track system, the double track forming part of the framework of the robotic car parking system, thereby enabling load handling devices to pass each other in either the X or Y direction whilst operating on the system.

Figure 5:
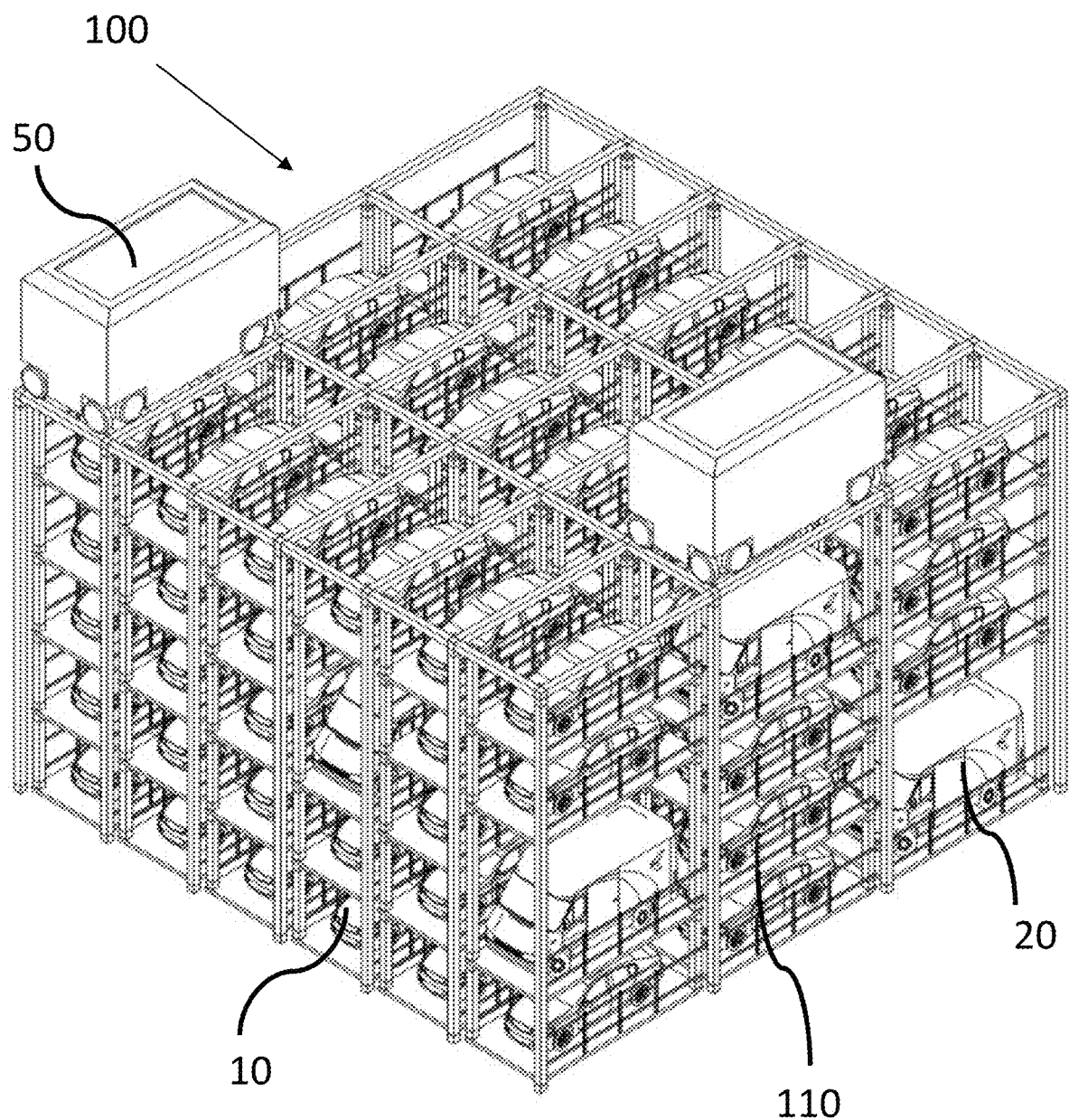
Figure 6:
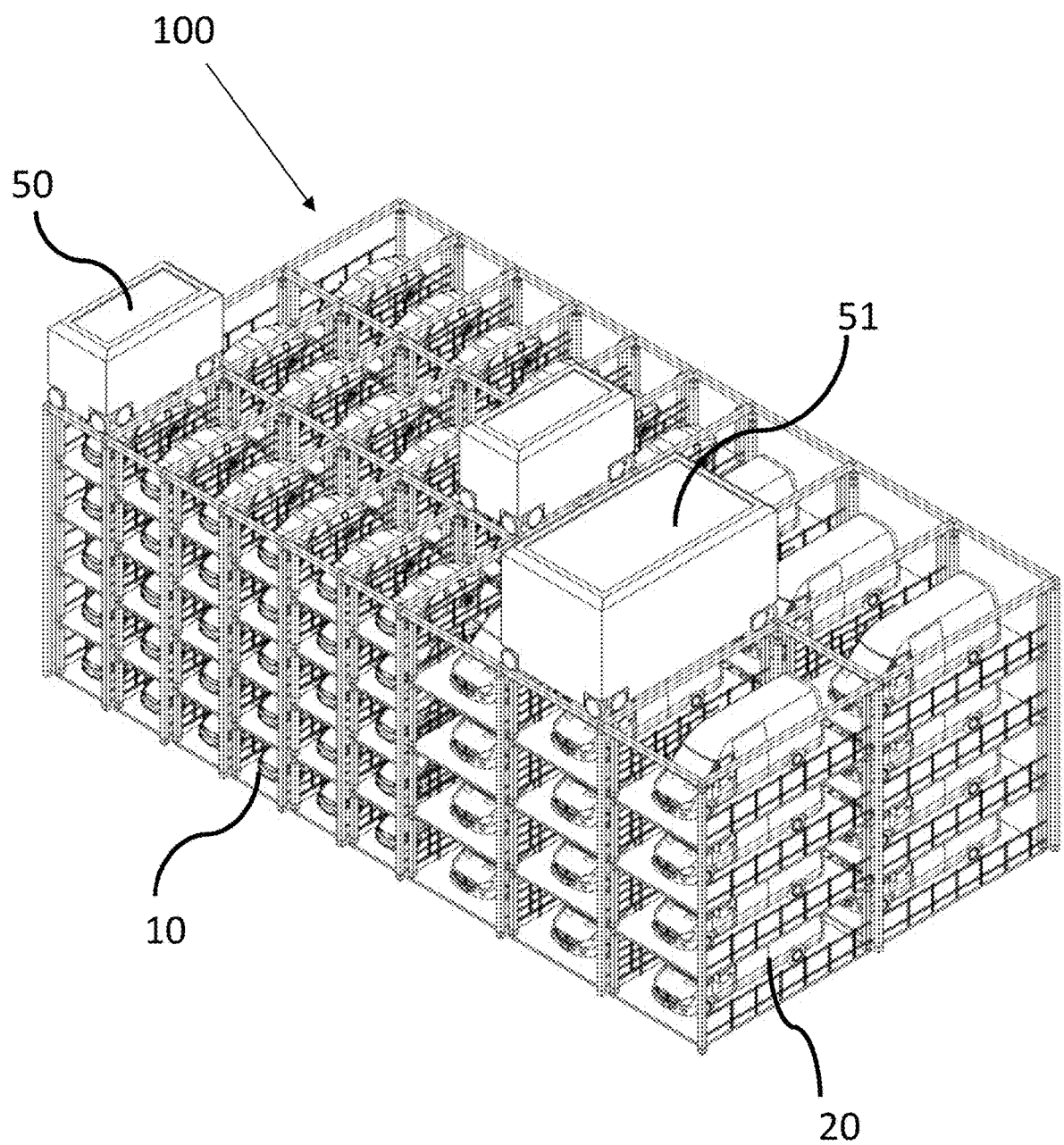
Figure 7:
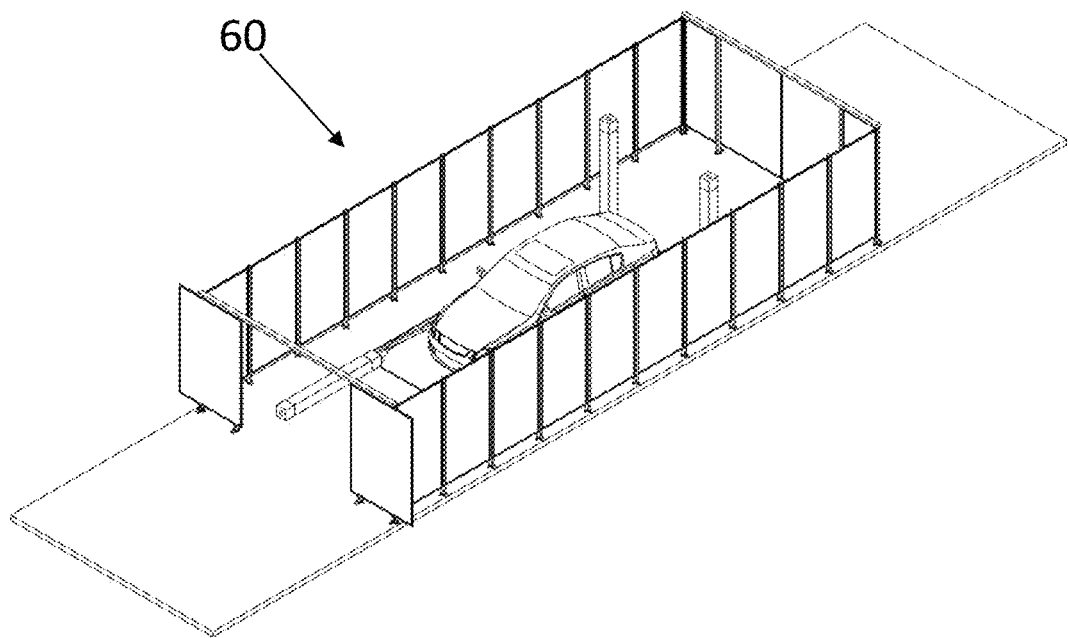
Figure 8:
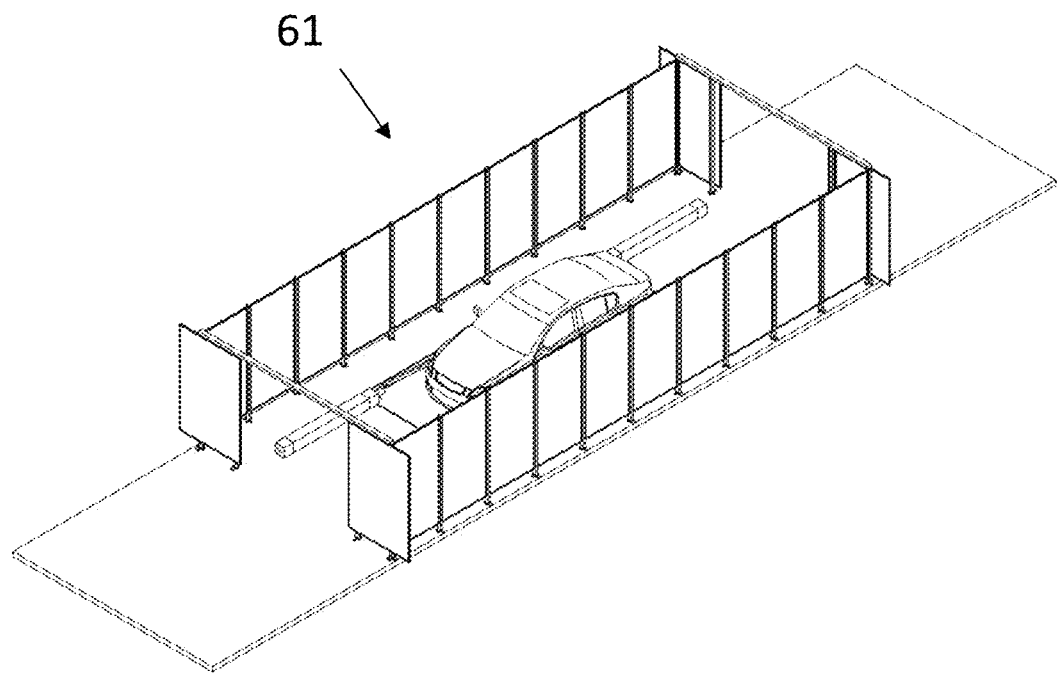
Figure 9:
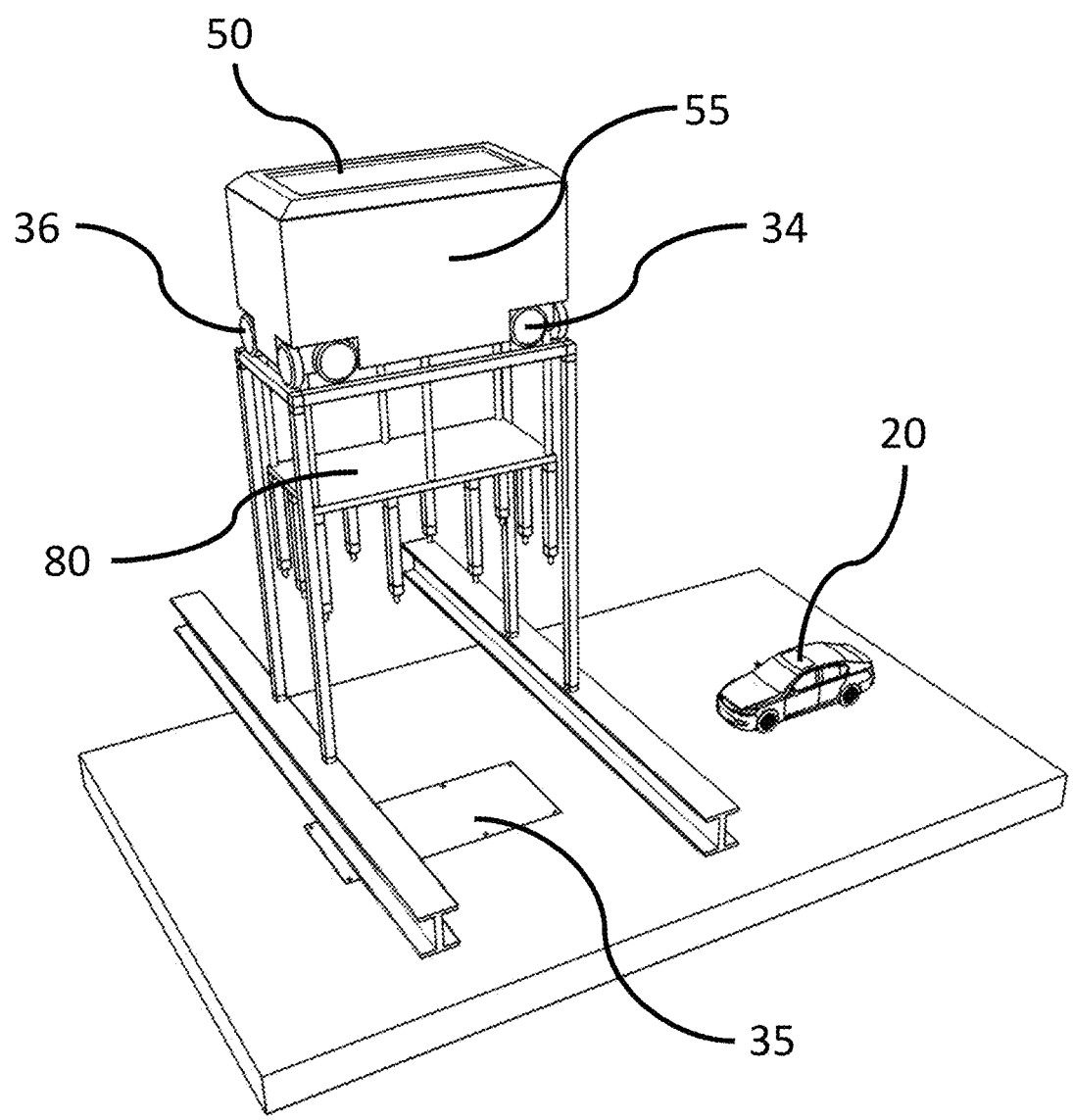
Figure 10:
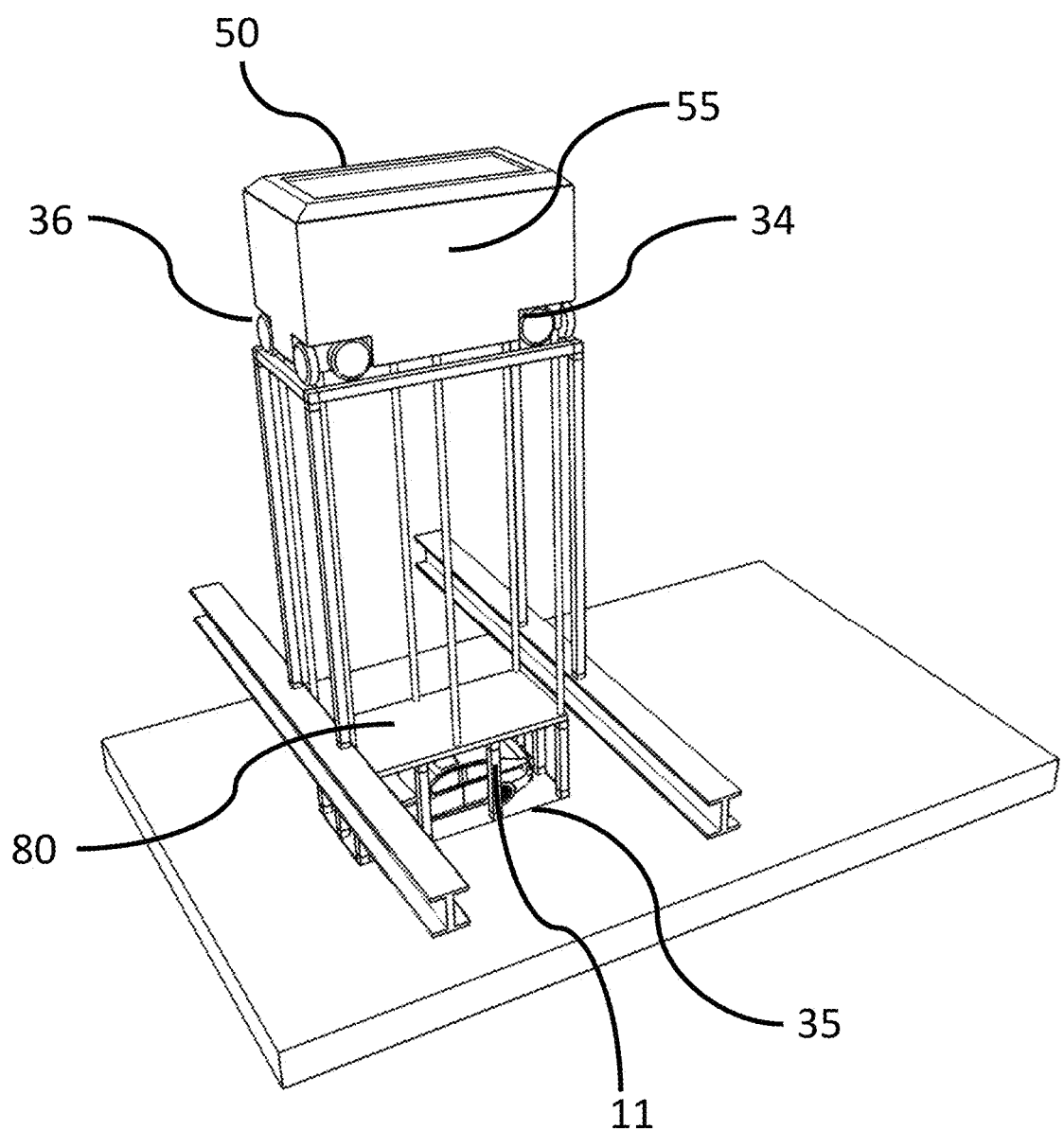
Figure 11:
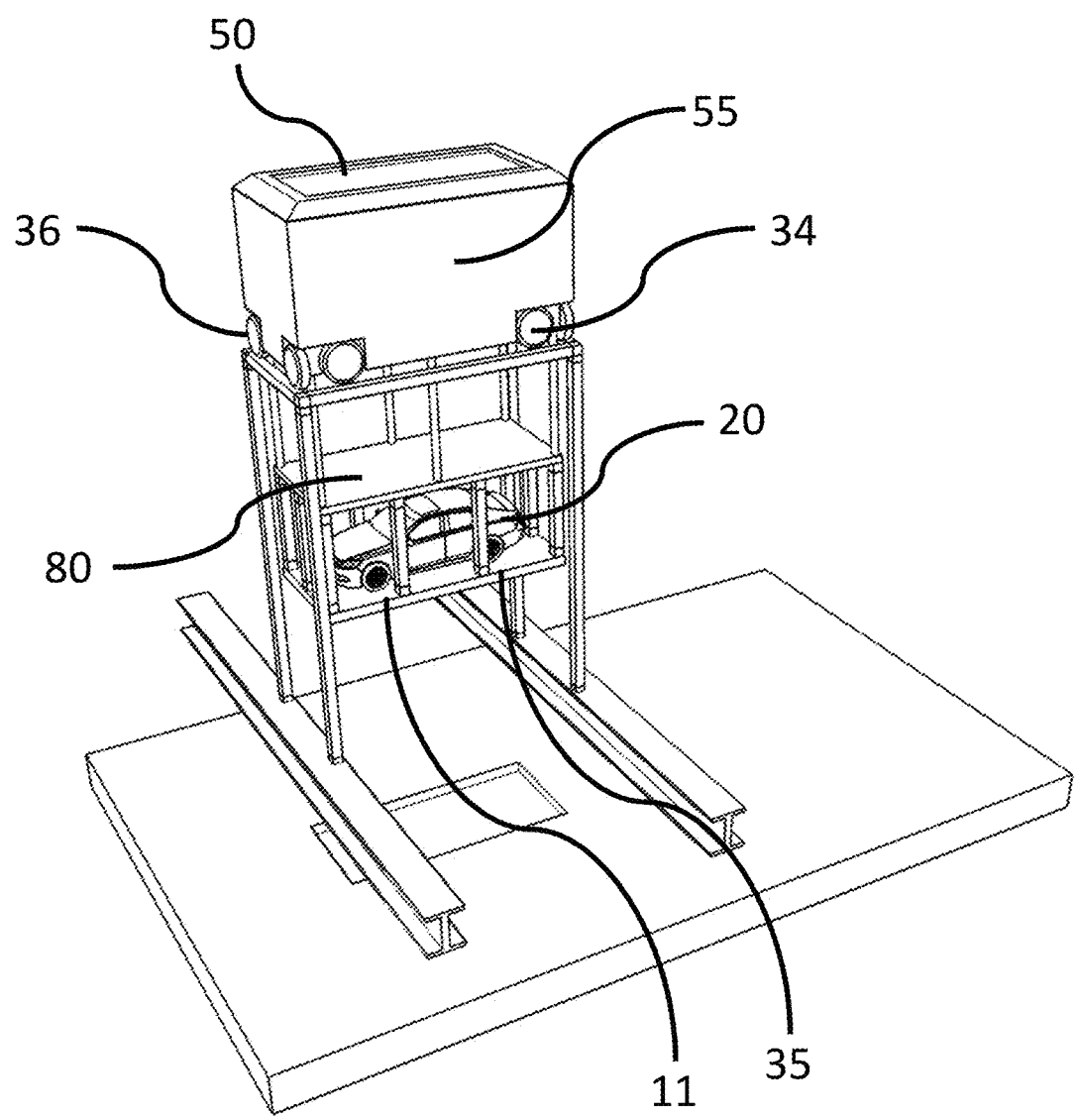
Figure 12:
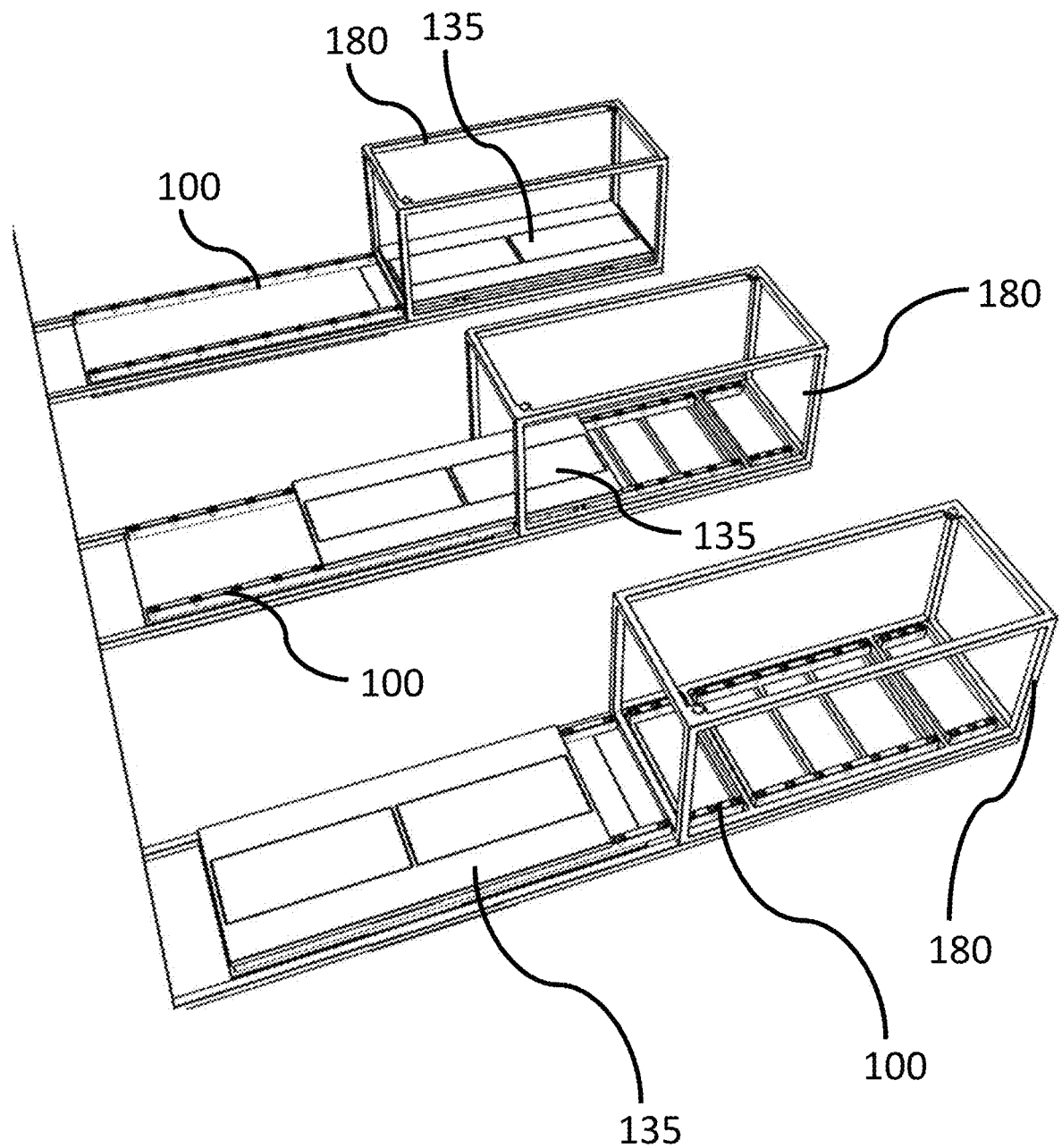
Figure 13A:
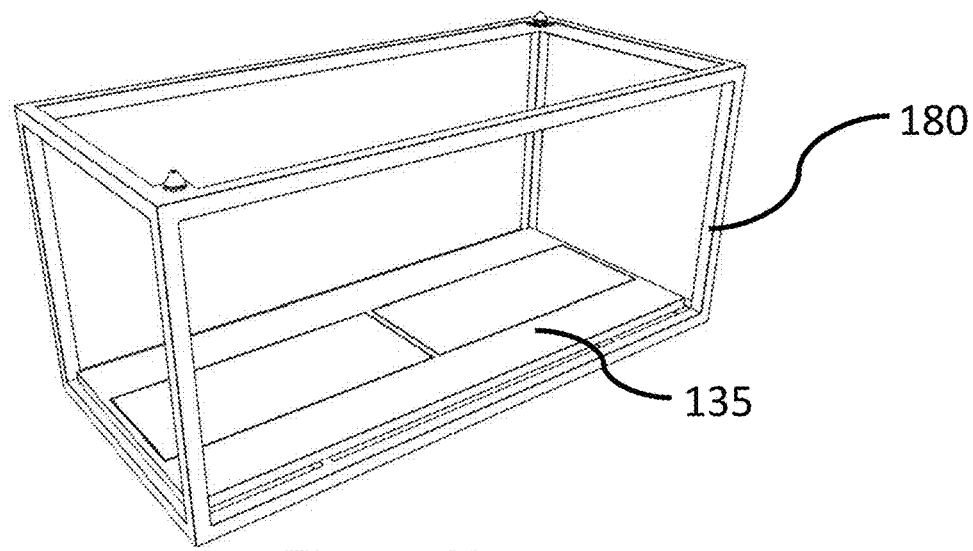
Figure 13B:
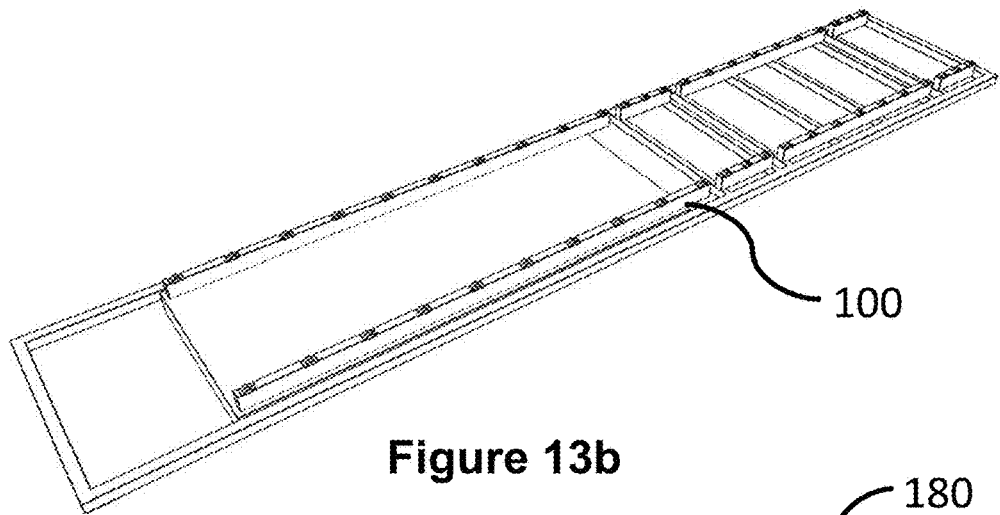
Figure 13C:
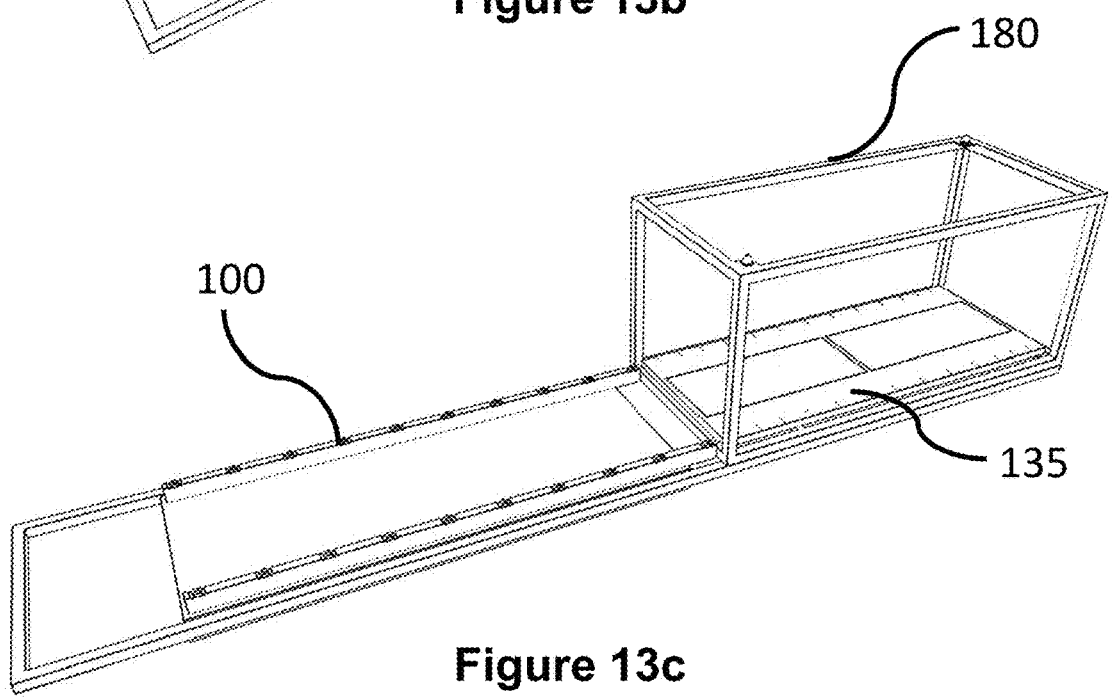
Figure 14A:
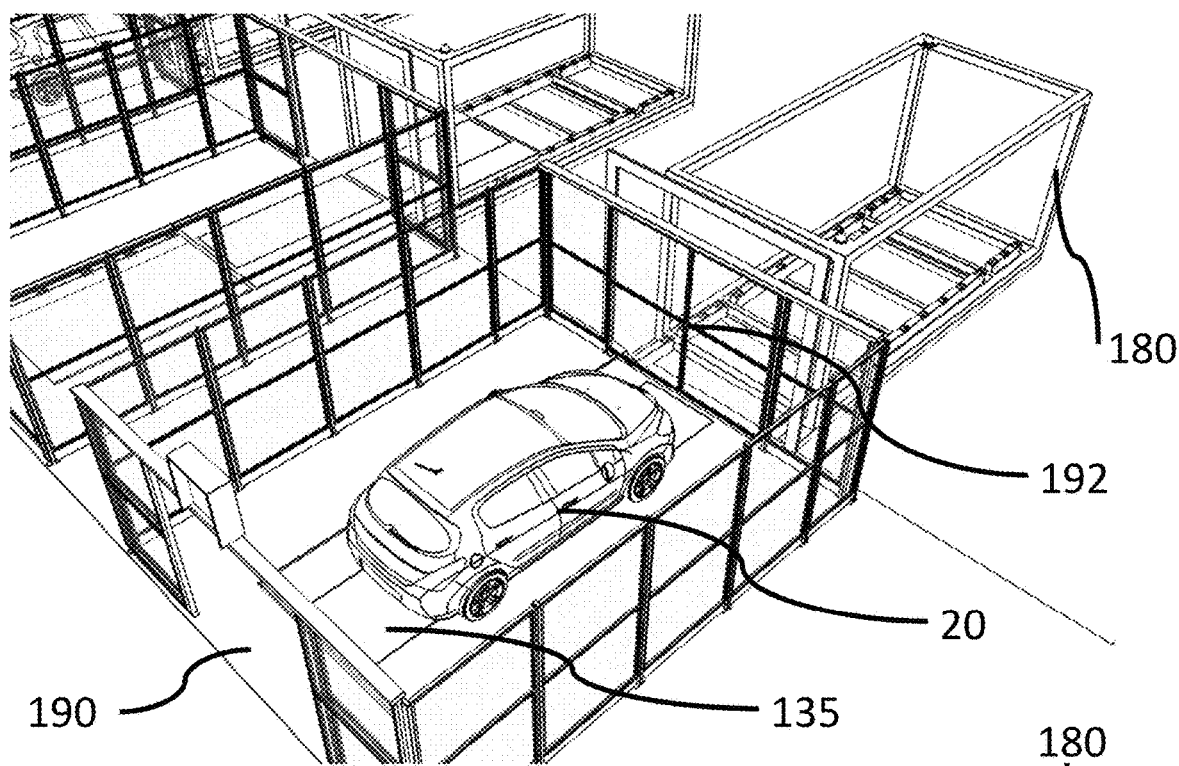
Figure 14B:
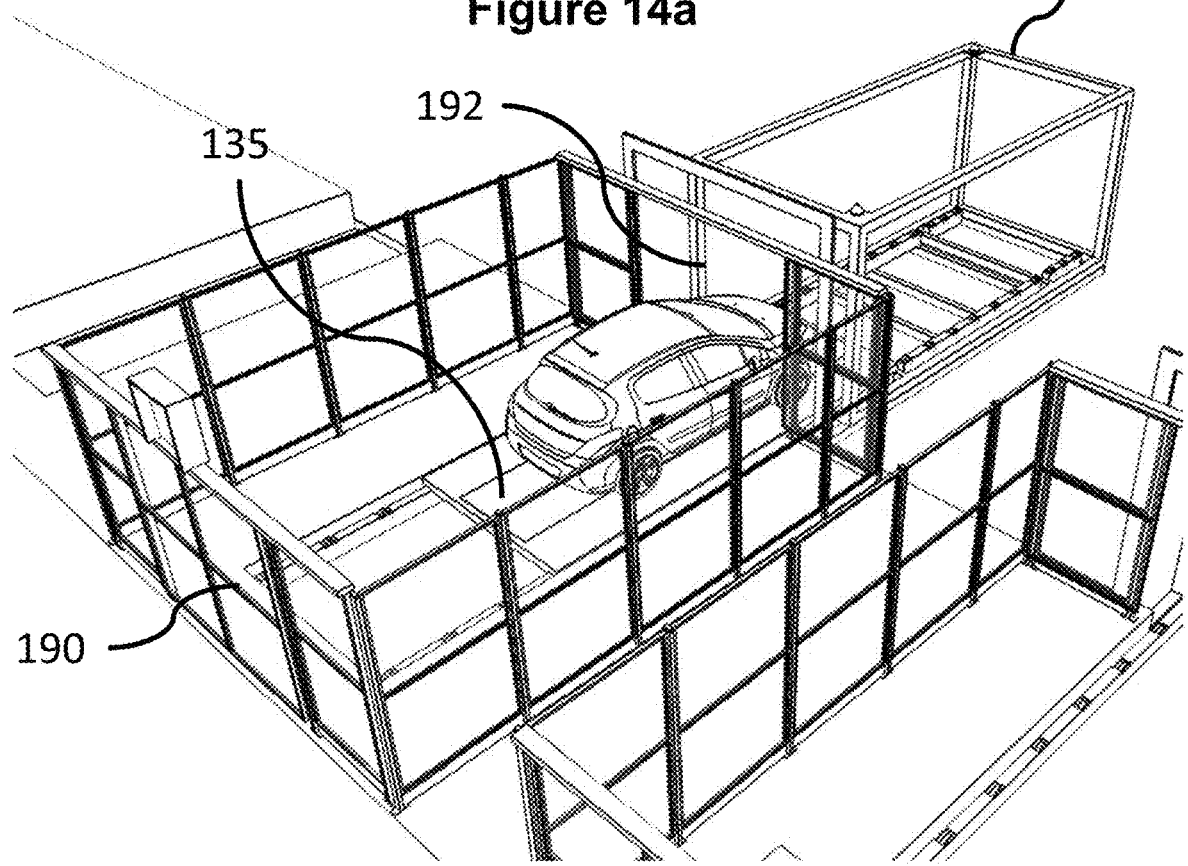
Figure 15:
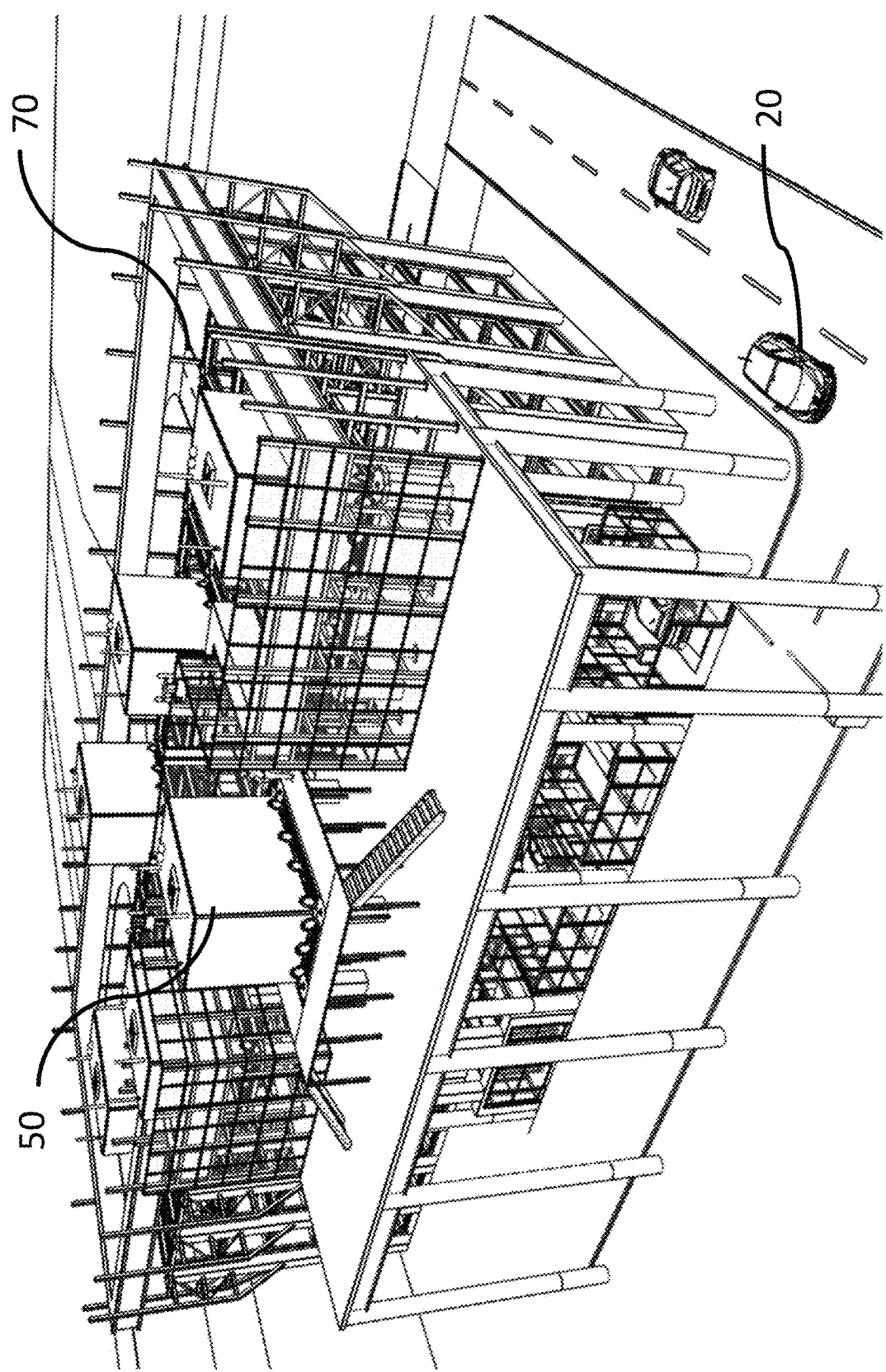

FIG. 5 shows a schematic perspective view of a robotic parking system in accordance with a further aspect of the invention, the system comprising containers of different sizes capable of carrying different sizes of vehicle within stacks;

FIG. 6 shows a schematic perspective view of the system in accordance with a further aspect of the invention, the system comprising two different sub-systems for different sizes of containers with different sized robotic load handlers;

FIG. 7 shows a schematic perspective view of an exit station of the system in accordance with the invention, two of the corner supports and the side barriers being folded down to allow entry of a driver in to the vehicle and to allow the vehicle to exit the device;

FIG. 8 shows a schematic perspective view of a combined entry/exit station of the robotic parking system where both short sides fold down to allow entry and exit of a vehicle in to or out of the system;

FIG. 9 shows a schematic drawing of a portion of the robotic parking system in accordance with one form of the invention, a load handling device, comprising a body and sets of wheels and, lowering a box-type structure in to an entry point with a detachable base to allow loading of the vehicle;

FIG. 10 shows a schematic drawing of the embodiment in FIG. 9, where the box-type structure is connected to the base to form a container, in position to be lifted by the load handling device;

FIG. 11 shows a schematic drawing of the embodiment of FIGS. 9 to 10 showing the container, comprising the box-type structure attached to the base and containing the vehicle, being lifted by the load handling device into the parking structure shown in FIG. 4;

FIG. 12 shows an alternative form of the robotic parking system in accordance with the invention, the system comprising a plate on which the vehicle is located prior to parking, the plate moving from a first position, where the driver and passengers can exit the vehicle safely, to a second position where the vehicle is located within a container for collection by a load handling device and for transport of the container in to the robotic parking system;

FIGS. 13a, 13b and 13c showing possible positions of the plate without the vehicle in situ for clarity;

FIGS. 14a and 14b show a schematic perspective view of one form of entry system for a vehicle, the system comprising an airlock type mechanism to ensure safety of users of the system; and FIG. 15 is a schematic perspective view of one form of robotic parking system showing all aspects of the system described above in use.

FIG. 1 shows a stackable container 10, the container 10 carrying a vehicle 20. The container 10 comprises 4 corner supports 30, a container base 35 and side barriers 40. The corner supports are moveable around a pivot point at the join with the base 35 such that the corner supports can fold down, as shown in FIG. 2, to allow easy movement and positioning of the vehicle 20 within the container 10. As shown in FIG. 3, the side barriers 40 are collapsible to allow easy entry in to the vehicle 20 from the container 10.

It will be appreciated that the word "container" is used here for a device which is primarily a platform with four heavy corner uprights 30 to support other containers 10 on top and sidings 40 especially on the short sides to ensure a vehicle 20 can never roll off the container 10 or any person accidentally left inside a vehicle 20 can get out of the vehicle 20 and in to danger. However it will be appreciated that the container 10 may be of any suitable form that is capable of carrying a vehicle 20 and supporting other containers 10 carrying vehicles 20 in a stack 110.

For example, in another embodiment of the invention the container 10 may comprise a platform having lowerable upturned sides and a cage or box structure that may be lowered over the vehicle 20, thereby completely enclosing the vehicle which may be advantageous for safety reasons.

In use, a plurality of containers are stacked on top of one another to form stacks 110. The stacks 110 are arranged within a frame structure 70. FIG. 4 shows stacks 110 each comprising five containers 10, the device 100 comprising a 6 by 3 block of stacks 110 within the frame structure 70. The frame structure 70 comprises a series of upright members 72 that support horizontal members 74a, 74b. A first set of substantially parallel horizontal members 74a is arranged substantially perpendicularly to a second set 74b of substantially parallel horizontal members to form a horizontal grid structure 74 supported by the upright members 72.

The members 72, 74 are typically manufactured from metal. The containers 10 are stacked between the members 72, 74 of the frame structure 70, such that the frame structure 70 guards against horizontal movement of the stacks 110 of containers 10, and guides vertical movement of the containers 10.

The top level of the frame structure 70 includes rails 74 arranged in a grid pattern across the top of the stacks 110. Referring to FIGS. 4, 5 and 6, the rails 74 support a plurality of robotic load handling devices 50. A first set 74a of parallel rails 74 guide movement of the load handling devices 50 in a first direction (X) across the top of the frame structure 70, and a second set 74b of parallel rails 74, arranged substantially perpendicular to the first set 74a, guide movement of the load handling devices 50 in a second direction (Y), substantially perpendicular to the first direction. In this way, the rails 74 allow movement of the load handling devices 50 in two dimensions in the X-Y plane, so that a load handling device 50 can be moved into position above any of the stacks 110.

Each load handling device 50 comprises a body 55 which is arranged to travel in the X and Y directions on the rails 74 of the frame structure 70, above the stacks 110. A first set of wheels 34, consisting of a pair of wheels 34 on the front of the body 55 and a pair of wheels 34 on the back of the body 55, are arranged to engage with two adjacent rails of the first set 74a of rails 74. Similarly, a second set of wheels 36, consisting of a pair of wheels 36 on each side of the body 55, are arranged to engage with two adjacent rails of the second set 74b of rails 74. Each set of wheels 34, 36 can be lifted and lowered, so that either the first set of wheels 34 or the second set of wheels 36 is engaged with the respective set of rails 74a, 74b at any one time.

When the first set of wheels 34 is engaged with the first set of rails 74a and the second set of wheels 36 are lifted clear from the rails 74, the wheels 34 can be driven, by way of a drive mechanism (not shown) housed in the body 55, to move the load handling device 50 in the X direction. To move the load handling device 50 in the Y direction, the first set of wheels 34 are lifted clear of the rails 74, and the second set of wheels 36 are lowered into engagement with the second set of rails 74b. The drive mechanism can then be used to drive the second set of wheels 36 to achieve movement in the Y direction.

In this way, one or more robotic load handling devices 50 can move around the grid at the top of the stacks 110 on the frame structure 70 under the control of a central picking system (not shown). Each robotic load handling device 50 is provided with means for lifting out one or more containers 10 from the stack 110 to access the required vehicle. Using multiple load handling devices 50 enables access vehicles 20 from multiple locations in the grid and stacks 110 at any one time.

In use, a vehicle 20 is manoeuvred into a container 10 at an entry point and the driver exits the vehicle 20. The corner supports 30 and side barriers 40 are raised and a load handling device 50 is instructed by a control system (not shown) to collect the container 10 and position it within the stacks 110 of containers 10.

The control system decides on the optimal point the vehicle should be positioned in the stacks 110. If the vehicle 20 is not required for a long period of time, it may be advantageous for the container 10 to be laced underneath containers 10 holding vehicles 20 that are needed more imminently. Therefore, the load handler 50 may move containers 10 already in the stacks 110 in order to create a position to place the container 10 holding the new vehicle 20 to be parked. Once a suitable position is created, the load handler 50 is positioned on the grid 74 at a point where it can pick up the container 10. The container 10 is lifted to within the body 55 of the load handler 50 and the load handler 50 is moved to a position on the grid 74 immediately above the position where the container is to be placed in a stack 110. If necessary, other containers 10 are back placed above the recently positioned container 10.

It will be appreciated that several load handlers 50 may need to work in cooperation to move containers 10 around in the stacks 110. Furthermore, load handlers may rearrange the stacks periodically in order to position vehicles 20 near the tops of the stacks 110 that will be needed soonest.

When a vehicle 20 needs to be retrieved from the stacks 110, a load handler 50 is positioned above the relevant stack 110 and removes the top container 10. If this container 10 holds the desired vehicle 20, the container 10 is moved to the exit point. If the container 10 does not contain the desired vehicle 20, the container is moved to an alternative stack 110 and the next container in the first stack 110 is accessed. This continues until the container 10 holding the desired vehicle 20 is retrieved. This container 10 is then moved to the exit point for collection.

In this way, a high density of vehicle packing is achieved, whilst easy deposit and retrieval of vehicles is maintained.

It will be appreciated that a control system, not shown, is provided with suitable means for identifying and monitoring which vehicle 20 is in which container and where in the stacks 110 it is located. The control means may use number plate recognition or may use a ticketing and bar coding system or any other suitable tracking means It will be appreciated that there is a grid structure to support the containers 10 horizontally. This means that the containers 10 can be designed for the corner supports 30 to take the vertical forces from the containers above, but do not need to take any horizontal forces. This way highly stable stacks 110 can be made from low cost containers 10.

It will be appreciated that vehicles 20 will be loaded into and out of containers 10 at dedicated entry and exit points. Examples of these entry and exit points are shown in FIGS. 7 and 8. As shown in FIGS. 7 and 8, the entry and/or exit points comprise an area where the container 10 is received from the load handling device 50. The entry and/or exit point may comprise additional barriers or fencing to protect users when the container 10 is being received from the load handling device 50.

In a further embodiment of the invention, the container 10 has one or two folding short sides incorporating the corner supports, which can be used as ramps to drive on and off, but will also allow the container to be as narrow as possible, since the vehicle will not need to be driven in between the load carrying pillars at the corners.

In yet another embodiment of the invention the long sides of the container are arranged so that they enable driver and passengers to open the doors at entry and exit stations, when either of the short sides are down. When the short sides are up, the long sides will provide a barrier, so that no doors can be opened. This to prevent a person who accidentally gets left inside a vehicle from getting into danger.

In a further embodiment, there is a heat or other sensor to ensure that no person or animal is left inside the vehicle before the container is closed.

In a further embodiment the driver of the vehicle 20 communicate with the parking system via a communication device such as a smartphone to set and modify the time to access the vehicle.

In yet another embodiment, the driver can specify a certain airplane or train on which he is travelling, and the parking control system can communicate with the air or train traffic control systems to estimate when the vehicle will be required.

In another embodiment of the invention, the priority of different drivers waiting for their vehicles can be set depending on how much they pay for the parking.

In a further embodiment, there are containers 10 of different heights and/or sizes to maximise space utilisation when there are vehicles of significantly different heights.

In another embodiment, there are two or more sizes of containers and load handlers for situations where a significant proportion of the vehicles are substantially smaller than others, the stacks 110 being arranged such that there are subsections of the system dedicated to differently sized vehicles.

In a final embodiment, automatic number plate recognition is used at the entry to the facility to get information about the model of vehicle, so that the driver can be directed to an appropriate entry station.

It will be appreciated that as each container supports the container 10 above it in the stack 110 each container 10 must be able to support the weight of the maximum number of containers 10 when fully laden with vehicles 20 that may be held in the stack 110. It is therefore important that the structure of the container is designed to accommodate such vertical forces.

In the embodiments described above, the container 10 comprises structural corner supports 30 mounted on a flat base 35. However, it will be appreciated that any suitable form of container 10 may be used that is capable of supporting laden containers 10 in the stack 110 above it.

As shown in FIGS. 9 to 11, the container 11 comprises a platform 35 and a box-type lid structure 80. It will be appreciated that in this embodiment, the box-type structure 80 would need to be able to support similarly configured containers 11 above it in the stack 110. This may require solid sides to be used for the box structure 80 or may require corner supports 30 to be used with a cage like box structure mounted thereon.

In use, the vehicle 20 is parked on the substantially flat base 35. Once the driver and any passengers have exited the vehicle 20, a box-like structure is lowered over the vehicle. The box-like structure 80 comprises four load carrying supports 30 in the corners and solid and/or mesh sides and roof, as required for stability and protection. The box-type structure 80 is removably attached to the base 35 in order to allow the container 11 to be moved within the parking system. The container 11, base 35 and box-type structure may be formed from steel, either solid sheets or mesh either in total or in combination. However, it will be appreciated that any suitable material may be used.

In a further embodiment of the invention, shown in FIGS. 12 to 14, an alternative mechanism for inputting vehicles in to the robotic parking system is shown.

As shown in FIG. 12, the alternative mechanism comprises a plate moveable mounted on a set of rollers 100. The plate 135 may be moved from a first position to a second position on the rollers 100. The rollers 100 may be driven by an appropriate driving mechanism. In the first position, the plate 135 is positioned such that a vehicle may be located thereon. In the second position, the plate 135 is positioned within a box-type structure 180 comprising at least corner supports. The box type structure 180 may comprise sides formed from a solid panel or a mesh type structure formed from any suitable material but preferably a structural metallic material. Preferably the box-type structure comprises solid sides so as to protect the robotic parking system, other vehicles and operatives, from fire within the box once the vehicle is parked.

The roller mechanism 100 within the box 180 is provided with rollerless recesses.

The underside of the plate 135 is provided with cooperating means to interact with the rollerless recesses in the base of the box 180.

The plate 135, when in the second position within the box-type structure locates in recesses within the roller mechanisms 100 in the base of the box. The recesses within the roller mechanism 100 enable the plate 135 to releasably locate at a fixed position within the box 180. Furthermore, the weight of any vehicle on the plate 135 will cause the plate 135 to locate in such a manner that the vehicle cannot move once the box 180 is lifted by the load handling device 50.

The mechanism by which the plate 135 and the roller mechanism interact is more clearly shown in FIGS. 13a to 13c. FIG. 13a shows the plate 135 in the second position in which the plate is fully located within the box 180 and securely positioned. FIG. 13b shows in greater detail the recesses in the roller system 100 that allows the plate 135 to correctly move and repeatedly locate in a secure position within the box 180.

FIG. 13c shows the plate 135 in the second position where the again the plate 135 is entirely within the box and the underside of the plate 135 is located such that the rollerless recesses in the base of the box 185 are located against cooperating portions of the plate 135.

As shown in FIG. 15, the density of parking achieved by the robotic parking system exceeds that of a standard multi storey car park as no entry and exit ramps or aisles are required.

In use, as shown in FIG. 14, a vehicle 20 enters through an open gate in to an entry point. The vehicle 20 is positioned on the plate 135, the plate 135 being located on the roller mechanism in the first position. Doors 192 to the parking system are closed. The driver and passengers exit the vehicle and the system through the doors 190. Once the doors 190 are closed, the doors 192 may open and the roller mechanism activates to move the vehicle located on the plate 135 in to the box 180. The plate 135 is driven on the rollers via any suitable drive system until the plate locates in the rollerless recesses in the base of the box 180. At this point the plate 135 will no longer move with respect to the box 180 and the vehicle is correctly and securely positioned within the box 180.

Once in the second position within the box, the door 192 will shut and the plate 135 will be substantially sealed against the base of the box 180. In this way, should there be any ignition of fuel within the box, no adjacent vehicles will be damaged and the fire may be contained within one box 180.

Once the box 180 is sealed the load handling device will be moved in situ and the box containing the vehicle will be lifted and positioned within a stack within the parking system. It will be appreciated that the box can be identified by suitable identification means and that the box 180 may be positioned with the stacks dependent on the length of time the vehicle is expected to remain within the car park.

In order to remove the car from the car park, the position of the box containing the target vehicle is identified and the load handling devices, either individually or in concert act so as to retrieve the target box 180 from within a stack within the system. Once retrieved by a load handling device 50, the box is returned to the entry/exit point of the car park where the box is deposited in the exit area. Once the doors 192 are opened, the roller mechanism acts in reverse to move the plate 135 from the second position within the box to the first position where the vehicle can be collected. Once in the first position, the door 192 closes and the driver can enter and retrieve the vehicle.

It will be appreciated that the plate 135 will need to be lifted so as to overcome the secured positioning of the plate 135 within the rollerless recesses within the box 180. This may be achieved by any suitable means but these may include providing a lifting mechanism operable to lift the plate 135 only once the box is located fully in the exit position.

Once in the exit position with the door 192 closed, the door 190 may open to allow the vehicle to exit.

Each box 180 may be provided with sprinkler means to extinguish any fire in the event of an emergency. It will be appreciated that the water or fire retardant fluid may be routed in to the box 180 via pipework mounted on or within the uprights 72 of the framework or the horizontal structural members 74. When not in use, the sprinkler pipes remain empty. In this way, leakage of water or fire retardant fluid is minimised.

When located within the box 180, the plate 135 may define a cavity enabling liquids such as oil, rain water and melted snow plus other road debris may collect in the cavity. The cavity will be sealed such that no liquids or debris leak on to vehicles or boxes 180 below. Furthermore, the cavity may be periodically cleaned in response to a signal from sensor means located within the cavity indicating that cleaning is required.

In the event of a fire being detected, only the boxes 180 in the given stack or the individual container containing the fire need be sprinkled. The box type structure may be sealed sufficiently to prevent the spread of fire due to lack of oxygen.

Other services may be routed to boxes in a similar manner. For example sensors may be located within the boxes 180 to monitor temperature, humidity, vibration, movement. Furthermore, camera means may be provided within each box to allow the car park operator to monitor the vehicles contained within the stack. All of these sensor mechanisms require power and may require data logging means. All such services and communication means may be routed to each box 180 via the uprights 72 of the framework or may be routed via the boxes 180 themselves.

UK Patent Application Nos GB1518091.2 and GB1518115.9, from which the present application claims priority, detail systems and methods of routing services through containers and framework structures and are hereby incorporated by reference.

It will be appreciated that the load handling devices 50 must be capable of lifting and moving laden containers. However, any suitable form of winch mechanism capable of lifting a laden container 10, 11 up and within the body 55 of the load handler 50 may be used.

It will be appreciated that the mechanisms described above are exemplary only and a skilled person in the art may be able to propose alternative mechanisms.

The invention claimed is:

1. A robotic parking system comprising:
   a plurality of vehicle holding containers, the containers being disposed in stacks within a frame work structure, the frame work structure including a series of substantially vertical uprights having a substantially horizontal grid mounted thereon, the grid including two substantially perpendicular sets of rails on which at least one load handling device is operable, the load handling device including a body mounted on wheels, a first set of wheels being arranged to engage with at least two rails of the first set of rails and a second set of wheels being arranged to engage with at least two rails of the second set of rails, the first set of wheels being independently moveable and driveable with respect to the second set of wheels such that when in motion only one set of wheels is engaged with the rails at any one time thereby enabling movement of the load handling device along the rails to any point on the grid by driving only the set of wheels engaged with the rails in which each container includes load carrying supports including corners of a box-type structure, the box-type structure adapted so as to removably attach to a movable plate, the movable plate and the box-type structure together forming a first vehicle holding container of the plurality of vehicle holding containers, the movable plate adapted so as to move from a first position remote from the box-type structure, to a second position within the box-type structure, wherein when a vehicle is located on the movable plate, the vehicle is configured to move on the plate into the box-type structure for onward transport into the parking system.

2. A robotic parking system according to claim 1, wherein the plate is movable from the first position remote from the box-type structure to the second position within the box-type structure by a roller mechanism.

3. A robotic parking system according to claim 2, wherein the roller mechanism within the box-type structure includes rollerless recesses and the underside of the plate includes cooperating means adapted to interact with the rollerless recesses in the box-type structure, wherein the plate releasably locates at a fixed position within the box-type structure.

4. A robotic parking system according to claim 1, wherein the box-type structure comprises sides formed from solid panels and a door, the sides and the door together with the plate in the second position form a sealed container.

5. A robotic parking system according to claim 1, wherein the vehicle holding containers comprises sensor means including at least one of a temperature sensor, a humidity sensor, a vibration sensor, and a movement sensor.

6. A robotic parking system according to claim 1, wherein at least one of the plurality of vehicle holding containers comprises fire extinguishing means.

7. A robotic parking system according to claim 1, wherein at least one of the plurality of vehicle holding containers comprises camera means to monitor any vehicle within the container.

8. A robotic parking system according to claim 1, wherein the framework of the parking system is configured to route services at least one of the vehicle holding containers via one or more of the substantially vertical uprights of the framework of the parking system.

9. A robotic parking system according to claim 1, wherein the plate defines a cavity which collects debris from at least one of the plurality of vehicles.

10. A method of parking a vehicle in a robotic parking system including a plurality of vehicle holding containers, the containers being disposed in stacks within a frame work structure, the frame work structure including a series of substantially vertical uprights having a substantially horizontal grid mounted thereon, the grid including two substantially perpendicular sets of rails on which at least one load handling device is operable, the load handling device including a body mounted on wheels, a first set of wheels being arranged to engage with at least two rails of the first set of rails and a second set of wheels being arranged to engage with at least two rails of the second set of rails, the first set of wheels being independently moveable and driveable with respect to the second set of wheels, wherein when in motion only one set of wheels is engaged with the rails at any one time thereby enabling movement of the load handling device along the rails to any point on the grid by driving only the set of wheels engaged with the rails in which each container includes load carrying supports including corners of a box-type structure, the box-type structure adapted so as to removably attach to a movable plate, the movable plate and the box-type structure together forming a vehicle holding container, the method comprising the steps of:
   a. locating a vehicle on the movable plate;
   b. moving the plate from a first position remote from the box-like structure to a second position within a box-type structure;
   c. attaching the plate to the box-type structure to form a first vehicle holding container of the plurality of vehicle holding containers;
   d. lifting the first vehicle holding container with the at least one load handling device; and
   e. locating the vehicle holding container on one of the stacks within the robotic parking system.

* * * * *